(12) United States Patent
Tew

(10) Patent No.: US 11,900,903 B2
(45) Date of Patent: Feb. 13, 2024

(54) INPUT DEVICE

(71) Applicant: DIGIT MUSIC LIMITED, Warwickshire (GB)

(72) Inventor: Simon Richard Tew, Warwickshire (GB)

(73) Assignee: Digit Music Limited, Warwickshire (GB)

( * ) Notice: Subject to any disclaimer, the term of this patent is extended or adjusted under 35 U.S.C. 154(b) by 405 days.

(21) Appl. No.: 16/972,313

(22) PCT Filed: Jun. 5, 2019

(86) PCT No.: PCT/GB2019/051560
§ 371 (c)(1),
(2) Date: Dec. 4, 2020

(87) PCT Pub. No.: WO2019/234424
PCT Pub. Date: Dec. 12, 2019

(65) Prior Publication Data
US 2021/0248984 A1    Aug. 12, 2021

(30) Foreign Application Priority Data
Jun. 6, 2018 (GB) ..................... 1809245

(51) Int. Cl.
*G10H 1/00* (2006.01)
*G06F 3/0338* (2013.01)
*G09B 5/06* (2006.01)

(52) U.S. Cl.
CPC ......... *G10H 1/0066* (2013.01); *G06F 3/0338* (2013.01); *G09B 5/06* (2013.01); *G10H 1/0091* (2013.01); *G10H 2220/315* (2013.01)

(58) Field of Classification Search
CPC ............... G10H 1/0066; G10H 1/0091; G10H 2220/315; G09F 3/0338; G09B 5/06
(Continued)

(56) References Cited

U.S. PATENT DOCUMENTS

| | | | | | |
|---|---|---|---|---|---|
| 4,469,330 | A | * | 9/1984 | Asher | ..................... A63F 13/24 |
| | | | | | 74/471 XY |
| 5,627,335 | A | * | 5/1997 | Rigopulos | ................ G10H 1/34 |
| | | | | | 84/611 |

(Continued)

FOREIGN PATENT DOCUMENTS

| GB | 1600170 B | 10/1981 |
|---|---|---|
| GB | 2456542 A | 7/2009 |

(Continued)

OTHER PUBLICATIONS

Search Report, International Property Office, United Kingdom, GB1809245.2, dated Dec. 6, 2018.

(Continued)

*Primary Examiner* — Christina M Schreiber
(74) *Attorney, Agent, or Firm* — Young Basile Hanlon & MacFarlane, P.C.

(57) ABSTRACT

The present invention relates to a music production system comprising one or more computer processor running music production software and an input device arranged to provide signal inputs to the music production software. The input device comprises a joystick, one or more sensor for monitoring the position and/or orientation of the joystick, and a controller. The sensor output is received by the controller and the controller generates a corresponding signal output to control one or more music production function of the software.

22 Claims, 6 Drawing Sheets

(58) Field of Classification Search
USPC .......................................................... 84/645
See application file for complete search history.

(56) References Cited

U.S. PATENT DOCUMENTS

| | | | | | |
|---|---|---|---|---|---|
| 5,763,804 | A | * | 6/1998 | Rigopulos | G10H 1/34 84/611 |
| 6,011,212 | A | * | 1/2000 | Rigopulos | G10H 1/42 84/610 |
| 6,327,367 | B1 | * | 12/2001 | Vercoe | G10H 1/0091 84/626 |
| 6,464,585 | B1 | * | 10/2002 | Miyamoto | G10H 1/043 463/30 |
| 10,108,273 | B2 | * | 10/2018 | McClive | G05G 9/047 |
| 2001/0021668 | A1 | * | 9/2001 | Takeda | A63F 13/48 463/37 |
| 2005/0195166 | A1 | * | 9/2005 | Cooper | G06F 3/038 345/161 |
| 2007/0080003 | A1 | * | 4/2007 | Koerlin | A61G 5/045 180/907 |
| 2007/0242042 | A1 | * | 10/2007 | Kelly | G06F 3/0346 345/161 |
| 2008/0223199 | A1 | * | 9/2008 | Clynes | G10H 1/0008 84/609 |
| 2011/0148667 | A1 | * | 6/2011 | Yeh | G05G 9/047 341/20 |
| 2012/0056810 | A1 | * | 3/2012 | Skulina | G06F 3/0338 345/161 |
| 2014/0267038 | A1 | * | 9/2014 | Adler | G06F 3/04842 345/161 |
| 2017/0315633 | A1 | * | 11/2017 | Yao | G06F 3/03543 |
| 2018/0004310 | A1 | * | 1/2018 | Drum | G06F 3/0354 |
| 2019/0250723 | A1 | * | 8/2019 | Chen | G06F 3/0338 |
| 2021/0043177 | A1 | * | 2/2021 | Bar-Or | G10H 1/34 |
| 2021/0248984 | A1 | * | 8/2021 | Tew | G06F 3/0338 |

FOREIGN PATENT DOCUMENTS

| | | | | |
|---|---|---|---|---|
| GB | 2506208 | A | | 3/2014 |
| JP | 2000189465 | A | | 7/2000 |
| JP | 2004065826 | A | | 3/2004 |
| KR | 20080100651 | A | | 11/2008 |
| WO | WO-2019211841 | A1 | * | 11/2019 ........... G10H 1/0008 |

OTHER PUBLICATIONS

Written Opinion of the International Searching Authority, European Patent Office, International Patent Application No. PCT/GB2019/051560, dated Aug. 9, 2019.

International Search Report, European Patent Office, International Application No. PCT/GB2019/051560, dated Aug. 9, 2019.

* cited by examiner

INPUT DEVICE

CROSS-REFERENCE TO RELATED APPLICATION(S)

This application is a national stage 371 application of International Patent Serial No. PCT/GB2019/051560 filed on Jun. 5, 2019, which claims priority to and the benefit of United Kingdom Patent Application Serial No. 1809245.2, filed on Jun. 6, 2018, the entire disclosure of which is hereby incorporated by reference.

TECHNICAL FIELD

The invention relates to an input device, and particularly to an input device for controlling music production software.

BACKGROUND

Music production is often done through software on a computer, tablet or mobile device, and the software may be hosted on the computing device itself, or on an online platform. Typically, input devices for such music production include a mouse-and-keyboard set-up, a touchscreen, and/or a MIDI Controller device. The input device is connected, wirelessly or via a cable, to a computer on which music production software is running or hosted. The music production software then interprets the signals from the input device and displays them in a user-friendly format (for example, in the form of musical notation on a score, or in a graphical format) and then the user can use the mouse and/or other features of the input device to manipulate the input signals in order to create the sound they require. The input device may be configured such that the actuation of a particular key or button equates to a musical note of a certain pitch and frequency. Often the input device will have a plurality of keys (e.g. a computer keyboard or a musical keyboard) wherein the software will interpret the input from each key differently.

How the input from each key is interpreted may be set by the user. The richness, tone, reverb, fade, and length of note can be configured within the software to create a note that sounds like it is being played using a real an instrument, such as a guitar. Furthermore, the user may manipulate the overall sound of a plurality of recorded inputs using the software. This provides the user with a large amount of creative control.

Conventional input devices for this type of software and process are not easily accessible by persons having certain disabilities, in particular those with limited limb movement and control, learning disabilities, and conditions such as autism. Such disabilities mean that manipulating a plurality of different keys (and types of keys/buttons) can be impossible, and this may prevent the person from being able to exercise their full creative abilities, and/or engage with music lessons. This can be particularly disadvantageous where the activity of engaging with music production could, in fact, provide significant therapeutic effects for that person. Therefore, there is a need for an input device which is adapted to enable people with certain disabilities to engage with music production and, where that person is in education, engage with music lessons and/or therapeutic creative sessions.

Input devices adapted for music production and/or music creation and for use by a person having a disability are known in the art. For example, eyetracking technology has enabled the development of software which allows the user to play a melody by looking at certain "buttons" or "keys" displayed on a display unit in a particular pattern or order. However, such technology does not provide the full breadth of creative control that is enabled by interacting with existing music production software. Furthermore, one of the primary problems with using such new technologies is that the user must input time and energy into learning how to use the new devices. This can be time-consuming and frustrating, and may ultimately result in that person becoming upset, losing interest and missing out on the above-mentioned benefits. The type of movement required from a lot of these pre existing sources means that some users will not be able to engage at all. Therefore, there is a clear need to provide an input device which enables people having certain disabilities and/or learning differences to have access to the full breadth of control over music production software programs intended by the developers. There is also a need to provide an input device which is intuitive to use and requires little or no training in order to be fully utilised.

SUMMARY

The present invention seeks to address at least some of the abovementioned issues, and, in accordance with an aspect of the present invention there is provided an input device communicably couplable to a remote computing device for enabling a user, in use, to generate input signals configured to control functions of a computer program running on said remote computing device, the input device comprising a main body and a joystick configured to cause input signals to be generated when operated.

The main body may comprise a first body portion having a first planar surface, wherein said joystick protrudes from said first body portion and may extend substantially perpendicularly to said first planar surface. The main body may further comprise a second body portion having a second planar surface. The second body portion may comprise at least one push button mechanism operable from said second planar surface and configured to cause an input signal to be generated when operated. The first and second planar surfaces may be adjacent and at an obtuse angle relative to each other.

In accordance with one exemplary embodiment of the invention, the second body portion may comprise a plurality of push button mechanisms.

Optionally, the input device may comprise a printed circuit board which may have a microcontroller mounted thereon, wherein the joystick and the at least one push button mechanism may be communicably coupled to the printed circuit board.

In an exemplary embodiment of the invention a USB cable may be coupled to said printed circuit board.

Optionally, the generated input signals may be configured to control music production software.

In accordance with a second aspect of the present invention there is provided, an input device communicable coupleable to a remote computing device for enabling a user, in use, to generate input signals configured to control functions of a computer program running on said remote computing device, the input device comprising a main body comprising a joystick configured to cause input signals to be generated when operated, said main body comprising a first body portion having a first planar surface, wherein said joystick protrudes from said first body portion, said main body further comprising an attachment member having an adjustable grip member at one end thereof for releasably securing said main body to a chair, in use.

According to an exemplary embodiment of the present invention the main body further may comprise a second body portion which may have a second planar surface.

Optionally, the second planar surface may comprise at least one push button mechanism which may be operable from the second planar surface and configured to cause an input signal to be generate when operated.

Optionally, the input device may comprise a printed circuit board having a microcontroller mounted thereon, wherein the joystick may be communicably coupled to the printed circuit board.

According to an exemplary embodiment of the present invention, the input device may comprise a USB cable which may be coupled to said printed circuit board.

Optionally, the attachment member may comprise an armature which may have a grip member at a first end thereof and a mounting plate at a second end thereof, the mounting plate may be shaped and configured to be removably fixed to a surface of the main body which may be diametrically opposite the first planar surface.

In accordance with a third aspect of the present invention there is provided an input device communicably coupleable to a remote computing device for enabling a user to generate input signals, in use, configured to control functions of a computer program running on said remote computing device, the input device comprising a main body and a joystick configured to cause input signals to be generated when operated, said main body comprising a first body portion having a first planar surface, wherein said joystick protrudes from said first body portion and extends substantially perpendicularly to said first planar surface said main body further comprising a second body portion having a second planar surface, said second body portion comprising at least one push button mechanism operable from said second planar surface and configured to cause an input signal to be generated when operated, and wherein said first and said second planar surfaces are adjacent and at an obtuse angle relative to each other, said input device further comprising an attachment member having an adjustable grip member at one end thereof for releasably securing said main body to a chair, in use.

In accordance with an exemplary embodiment of the present invention, the second planar surface may comprise a plurality of buttons.

Optionally, the input device may further comprise a printed circuit board which may have a microcontroller mounted thereon, wherein the joystick and the at least one push button mechanism may be communicably coupled to the printed circuit board.

According to an exemplary embodiment of the invention, the input device may further comprise a USB cable which may be coupled to the printed circuit board.

Optionally, the attachment member may comprise an armature which may have a grip member at a first end thereof and a mounting plate at a second end thereof, the mounting plate may be shaped and configured to be removably fixed to a surface of the main body which may be diametrically opposite the first planar surface.

In accordance with at least one exemplary embodiment of the present invention the input signals may be configured to control music production software. The sensor output may received by a controller of the input device and the controller may generate a corresponding signal output to control one or more music production function of the music production software. The music production function may be a music composition function or other production function that alters/amends the music, e.g. as opposed to a simple playback function.

BRIEF DESCRIPTION OF THE DRAWINGS

Embodiments of the present invention will now be described, by way of examples only, and with reference to the accompanying drawings in which.

DETAILED DESCRIPTION

The following description includes directional adjectives such as upper, lower, clockwise, anti-clockwise, left, side, bottom, top, under, above, vertical, horizontal, and so on. These adjectives are used to describe the exemplary embodiment of the invention so illustrated in the accompanying drawings and the invention is not necessarily intended to be limited in this regard. It will be apparent to those skilled in the art that embodiments of the invention described may be oriented differently to the orientation illustrated in the figures as required.

Figure 1:
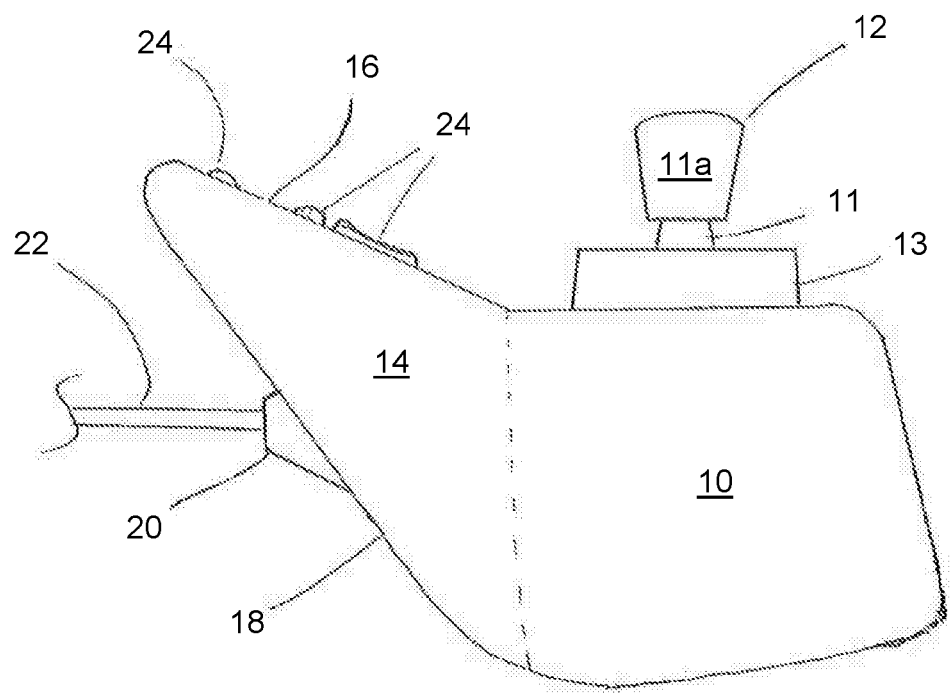
FIG. 1 is a schematic side-view of an input device according to an exemplary embodiment of the invention.

Referring to FIG. 1, there is illustrated an input device according to an exemplary embodiment of the invention shaped and configured to look similar to a conventional wheelchair controller device. Specifically, the illustrated input device comprises a generally cuboidal main body with a first body portion 10 having a joystick 12 mounted on a surface thereof.

The joystick 12 comprises a shaft 11 extending through an aperture (not shown) in the surface of said first body portion 10. The shaft 11 is constructed from a rigid material and may have a generally circular cross-section. Alternatively, the shaft 11 may, for example, have a polygonal cross-section and the present invention is not intended to be limited in this regard. The illustrated joystick 12 may comprise a handle or knob portion 11*a* at the distal end of the shaft 11 (i.e. the point furthest from the first body portion 10). The knob portion 11*a* can have a number of attachment types to suit the needs of the user. At the opposing end of the shaft 11, the joystick is received within a socket which allows for pivotal movement of the shaft in a plurality of directions in and/or around an active input region defined, in part, by the aperture. The aperture (not shown) through which the shaft 11 extends is larger than the diameter of the shaft 11 to allow for movement. The aperture may be circular, to allow for full 360 degrees of pivotal movement. Alternatively the aperture may comprise a number of barriers to prevent movement in certain directions, or the aperture may be polygonal to help guide the user to move the joystick in certain directions. The joystick 12 may optionally comprise a rubber dust washer 13 which is flexible to allow for movement in any required direction.

The joystick 12 is communicably coupled to a plurality of electronic components housed within the main body. The electronic components will be described in more detail hereinafter, and with reference to FIG. 5 of the drawings.

The joystick 12 comprises a biasing mechanism which acts against the direction of movement from the equilibrium position, wherein the equilibrium position is where the shaft 11 is substantially perpendicular to the plane of the surface of the first body portion 10 from which it extends. The equilibrium position is detected by the device as a "central dead-zone". A central dead-zone is defined as detection of no joystick movement. In order to re-create the same experience for the user as if they were controlling an electric wheelchair, the biasing mechanism may be of a similar strength to provide the same tactile feedback to the user as they would expect from using a wheelchair controller device.

A tapered platform 14, or second body portion, forms the rest of the main body. The platform 14 extends from a surface of said first body portion 10, adjacent to the surface on which the joystick 12 is located, and at an angle thereto. The platform 14 comprises a planar surface 16 on one side and a generally convex surface 18 on the opposing side. The planar surface 16 is formed integrally with the surface of the first body portion 10 on which the joystick 12 is located, but protrudes at an obtuse angle thereto such that the distal end of the platform 14 is approximately aligned vertically with the top of the joystick 12. Therefore, the surface of the first body portion and the planar surface of the second body portion combine to form a single operable surface having a bend therein.

The distal end of the platform is rounded. The overall shape of the planar surface 16 may be described as "U"-shaped. The base of the convex surface 18 is formed integrally with the opposing surface of the first body portion 10 on which the joystick 12 is located. Similarly, the parts of the convex surface 18 which face in opposing directions (i.e. the side surfaces) are formed integrally with two opposing side surfaces of the first body portion 10. In use, the input device will be oriented such that the platform 14 is directed away from the user and the joystick 12 is directed upwardly. However, for ease of use for some people, it may be that the device is oriented such that the joystick is directed side-ways in a left-hand, or right-hand, direction, or even pointing toward the user, and the present invention is not necessarily intended to be limited in this regard.

Figure 2:
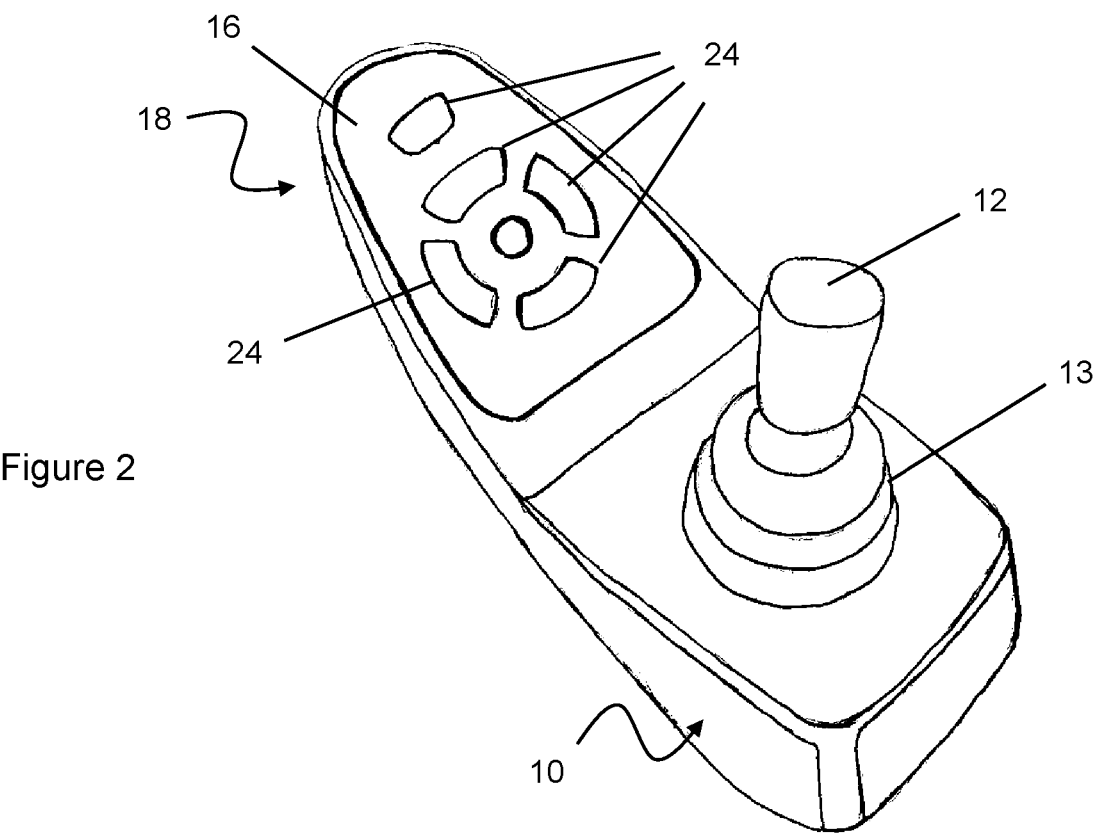
FIG. 2 is a schematic perspective view of the input device of FIG. 1.
Figure 3:
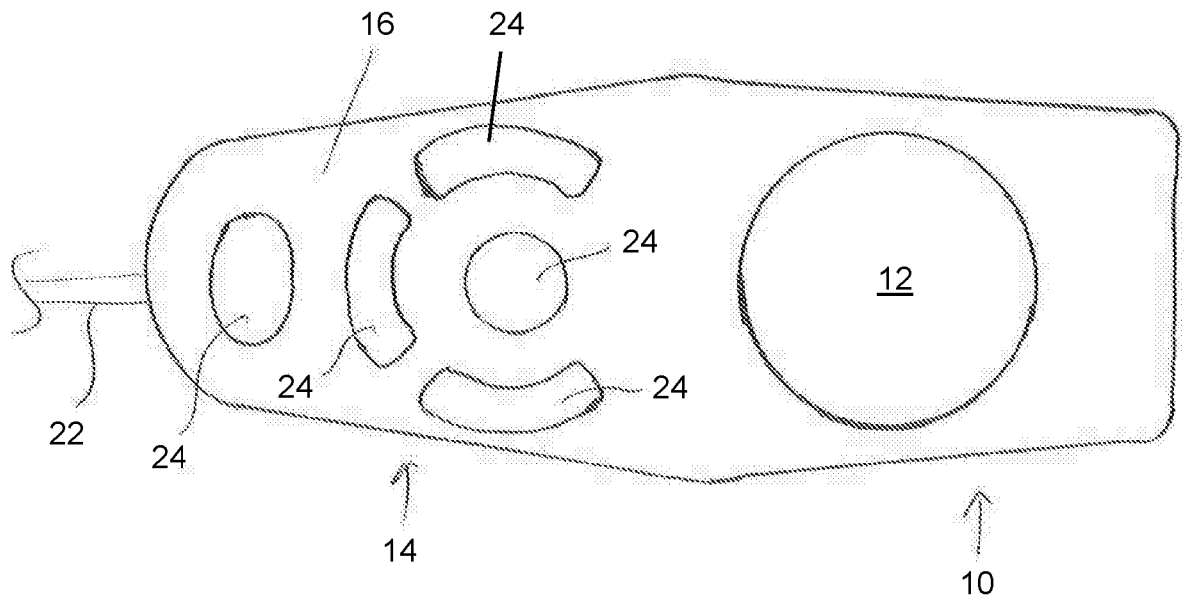
FIG. 3 is a schematic plan view of the input device of FIG. 1.

The input device comprises a plurality of other manual inputs. Referring to FIGS. 2 and 3 of the drawings, a plurality of push button caps 24 protrude from the planar surface 16 of the platform 14. Each push button cap 24 is communicably coupled to the electronic components housed within the main body 12. The push button caps 24 are comprise a rubber, and/or a pliable/deformable material. This kind of material will absorb any high impact forces applied to the surface thereof, protecting the electrical circuitry within the device. This may be particularly advantageous where the user has a disability which has symptoms including spontaneous or uncontrolled limb movements.

An input/output port 20 is located generally centrally within the convex surface 18. A wired connection 22 joins the input/output port 20 to a music production system (not shown). The music production system may comprise dedicated music production hardware/software (e.g. a sequencer). Additionally or alternatively, the music production system comprises a conventional computing device (e.g. a desktop computer, a laptop, a tablet computer device, or a mobile device, such as a mobile phone) running music production software (i.e. Digital Audio Workstation). Various examples of music production software are available in the prior art.

Although the input device in the drawings is illustrated as having a physical wire connection to the music production system, it will be apparent to those skilled in the art that a wireless connection may be made between the input device and the music production system receiving the input data, for example by using RF (radio frequency) waves, Wifi, Bluetooth® or other wireless technology. Alternatively, the wired connection may be electrical wiring or, optionally, comprise optical wires (e.g. TOSLINK). The present invention is not necessarily intended to be limited in this regard.

Typically, this layout of buttons and joystick is familiar with known wheelchair input devices used to control movement of an electric wheelchair. This has the unique advantage of being suitable for use by people with certain disabilities. Many people with disabilities already use an input device shaped and configured in a similar way to the above-described exemplary embodiment of the invention, therefore they are familiar with the controls and do not need to spend much time in learning a different set of controls.

The input device may comprise or include an attachment member, such as a bracket or clamp to allow the device to be fixed to a secondary surface, such as a table, desk, or similar, or even to the arm of a user's wheelchair.

Figure 4:
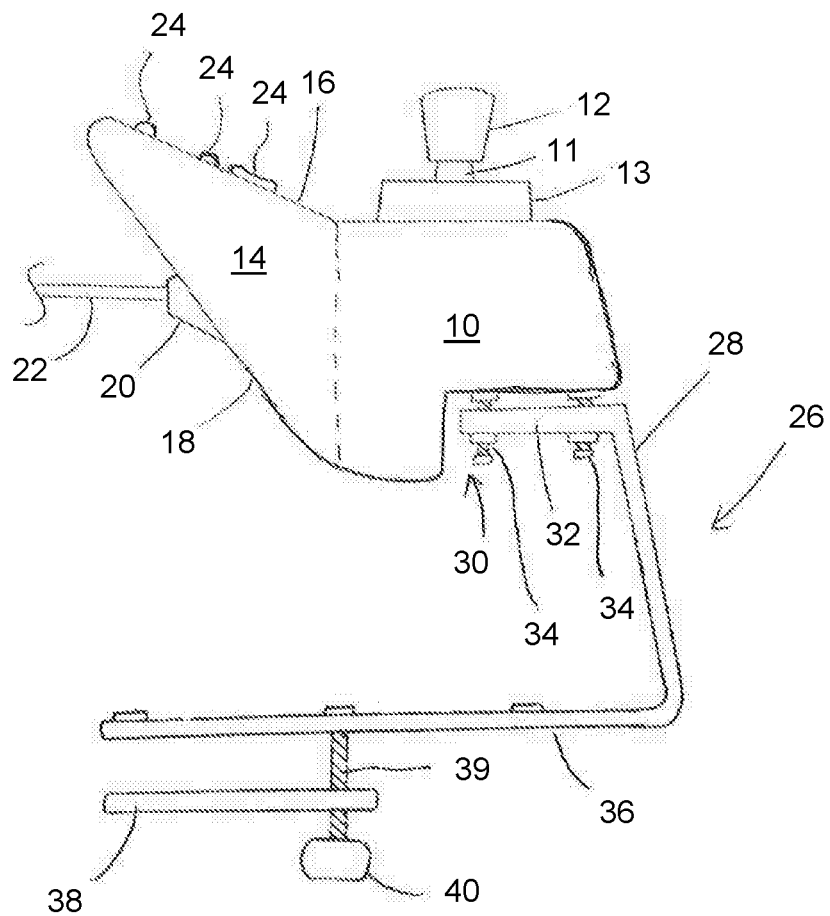
FIG. 4 is a schematic side view of the input device of FIG. 1 including a table-top adaptor.

Referring in particular to FIG. 4 of the drawings, there is illustrated an input device having an attachment member indicated generally at 26. In the illustrated exemplary embodiment of the present invention, the input device comprises a recess 30 shaped and configured to receive a connector plate 32. The connector plate 32 is removably fixed to a surface of the recess 30 such that the connector plate 32 is substantially parallel with the surface of the first body portion 10 on which the joystick 12 is located. The connector plate 32 may be fixed in place using known fixing means such as nut and bolt assemblies 34. Other suitable means for fixing the connector plate 32 within the recess 30 may be known in the art and the present invention is not necessarily intended to be limited in this regard.

In some alternative exemplary embodiments of the present invention the connector plate 32 may be formed integrally with the first body portion 10 of the input device. An armature 28 formed integrally with the connector plate 32 extends away from the first body portion 10 of the input device.

A foot plate 36 extends from a distal end of the armature 28, substantially perpendicular thereto. The foot plate 36 is substantially parallel to the connector plate 32. The foot plate 36 is mechanically coupled to a grip plate 38 by a screw 39 and rotatable knob 40. The screw 39 protrudes through an aperture in the grip plate 38 and a corresponding, vertically-aligned aperture in the foot plate 36. The aperture in the foot plate 36 comprises a complimentary screw thread which engages with the screw thread of the screw 39. The grip plate 38 is fixedly mounted on the screw 39. This may be achieved by applying an adhesive substance to the inside of the aperture. The rotatable knob 40, which is fitted to the lower end of the screw 39, can be rotated in a first direction to cause the screw 39 to be drawn upwardly. This decreases the distance between the foot plate 36 and the grip plate 38.

The rotatable knob 40 can be rotated in a second direction to cause the screw to be drawn downwardly through the aperture in the foot plate 36. This increases the distance between the foot plate 36 and the grip plate 38. Therefore, in this manner, the attachment member 26 can be fitted to any surface. The length of the screw 39 limits the maximum distance between the foot plate 36 and the grip plate 38. Therefore, the screw 39 length may be chosen according to the requirements of use.

In other examples, the armature 28 may be connected to the foot plate 36 or input device/connection plate 32 via a joint. The joint may be lockable and releasable to allow alteration to the position and/or orientation of the input device to suit the user.

In an alternative embodiment, the attachment member 26 comprises a pivoting type clamp (e.g. a claw grip). The attachment member comprises a stem rotatable with respective to the clamp, to allow rotation of the input device. The stem may be connected to the clamp via a first joint having a first ball and socket arrangement or the like. The attachment member comprises a plate configured to attach to the input device. The plate is connected to the stem via a second joint (e.g. having a first ball and socket arrangement) to a permit a further axis of movement.

The first joint and/or second clamp comprise a securing means to fix the angle of the joint(s). The clamp comprises a screw or the like to allow to variation of the distance/angle between individual clamp members.

Figure 5:
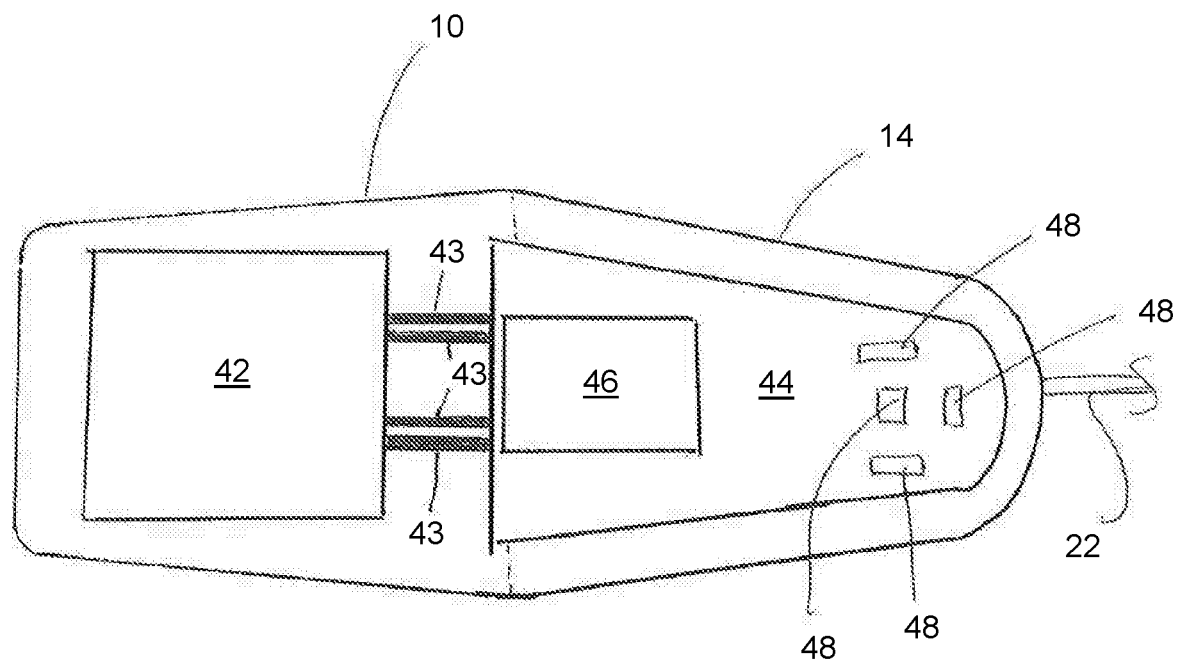
FIG. 5 is a schematic plan view of the input device of FIG. 1 showing the electrical components exposed.

Referring now to FIG. 5 of the drawings, a schematic exemplary embodiment of the inner electrical components is illustrated. Within the first body portion 10, directly below the joystick shaft 12, there is provided a joystick base 42. This is wired to a printed circuit board (PCB) 44.

Push button switches 48 are mounted on the PCB 44 and are located to align with the push button caps 24 present on the tapered platform 14 when the device is assembled for use. The push button switches 48 send signals to the microcontroller 46 when the push button caps 24 are pressed. Additionally or alternatively, the input device comprises other manual inputs, for example, rocker switches or rotatable dials (e.g. potentiometers). The rotatable dial may be rotationally incremented to selection from plurality of discrete outputs.

The microcontroller 46 is configured to receive and interpret the signals from each of the inputs accordingly.

The joystick base 42 transfers data representative of the joystick movement in an analogue format to the PCB via electronic signals through electrical wiring 43. A microcontroller/microprocessor 46 is mounted on said PCB 44 and electrically communicable therewith. The microcontroller/microprocessor 46 may be any suitable microcontroller/microprocessor as is known in the art. The present embodiment uses an ARDUINO® microcontroller board which is particularly suited to receiving inputs and generating output signals in a different format. The microcontroller/microprocessor 46 converts the analogue signals into a suitable computer-readable format (e.g. digital signals) ready for transmission to a computer/music production system via the USB cable 22. The USB cable 22 is also electrically communicable with the PCB and connected therewith.

The microcontroller may be particularly configured to disregard certain movements. For example, in the case where the user has a disability which causes random and uncontrolled movement of the limbs, the joystick 12 might be accidentally momentarily moved in a direction. The joystick base 42 may still transmit the movement signal to the PCB 44, and subsequently the microcontroller 46, however the microcontroller 46 may disregard the signal if it has a time period of less than a pre-determined length of time. Therefore, the user does not accidentally cause changes in the software which might otherwise result in frustration.

The sensitivity of the detected movements can be adjusted according to the user. For example, where a user has good limb control, but lacks in strength, the sensitivity may be set to high in order to provide the full range of interaction with the computer and computer software.

In some exemplary embodiments of the invention, the USB 22 may allow for two-way communication between the computer and the input device. Therefore, the microcontroller may comprise a bank of assignments for each joystick 12 movement and button switch 48 between which it may select the suitable assignments according to the software being run on the computer.

Alternatively, the microcontroller may only comprise a single set of assignments which are readable by a number of different software applications.

The input device comprises a plurality of lights (e.g. LEDs) to provide an indication of the operation of the device. One or more lights may be associated and/or formed integrally with a respective push button 48.

The lights may illuminate when the button 48 is pushed/toggled into a depressed state, thereby indicating activation of the button 48.

Additionally or alternatively, one or more of the lights may illuminate to provide an indication to user to press the associated button. This may guide the user to press a desired button at a particular time and/or in a particular sequence.

One or more of the lights may be changeable in emitted colour (e.g. "RGB" type LEDs).

One or more of the lights may illuminate intermittently with a predetermined period of time between illuminations to provide a metronome for the user. The period of time is variable and may be determined by the music production system.

Figure 6:
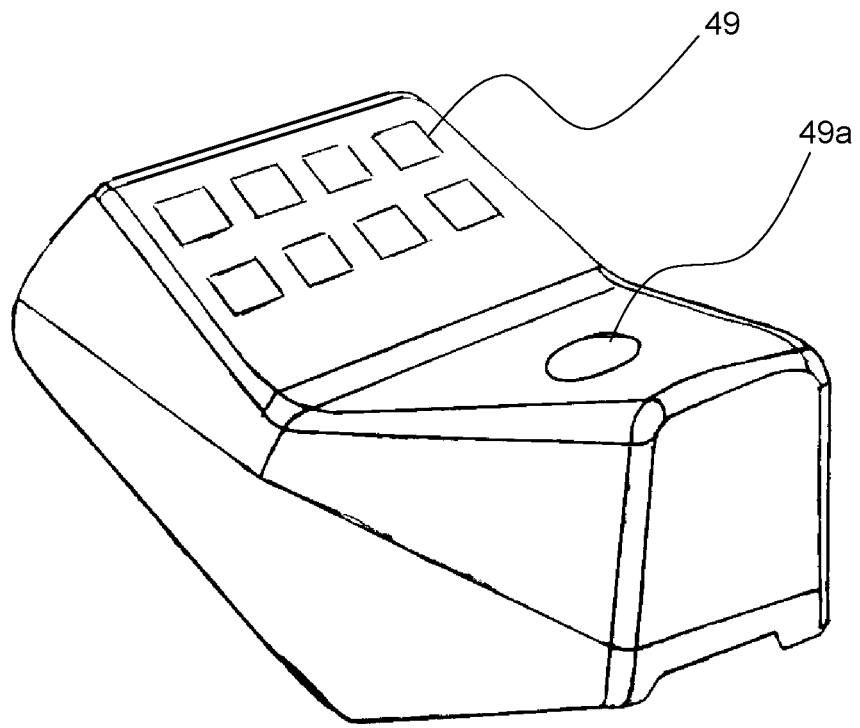
FIG. 6 shows a alternative casing of the input device.

FIG. 6 shows an alternative casing for the body portion 10. The casing a comprises a plurality of apertures 49 to allow access to a plurality of respective switches 48. The apertures 49 are arranged in a 2×4 array, however, it can be appreciated that any such arrangement is suitable depending on the needs of the user. A second aperture 49a is provided to allow the joystick to protrude therefrom.

It can be appreciated that any features hereinbefore described may be in used in either of the described input device casings.

The joystick 12 and/or the associated electronics delineate the position of the joystick into a plurality of discrete zones 50.

The zones 50 may be labelled as "up" (i.e. pushing the joystick 12 away from the user), "down" (i.e. pulling the joystick 12 toward the user), "left", and "right" (i.e. moving the joystick 12 left and right respectively).

Additionally, the device may be configured to detect a higher resolution of movement. For example, if the user directs the joystick 12 to a point between a wholly "up" direction and a wholly "left" direction, then the movement may be detected as a sub-category of movement, namely, "up-left". Similarly, movements such as "up-right", "down-left" and "down right" may also be detected. It can be appreciated that any number of zones may be delineated and the position/orientation/size/shape of the zones may vary according to the requirements of the user.

Figure 7:
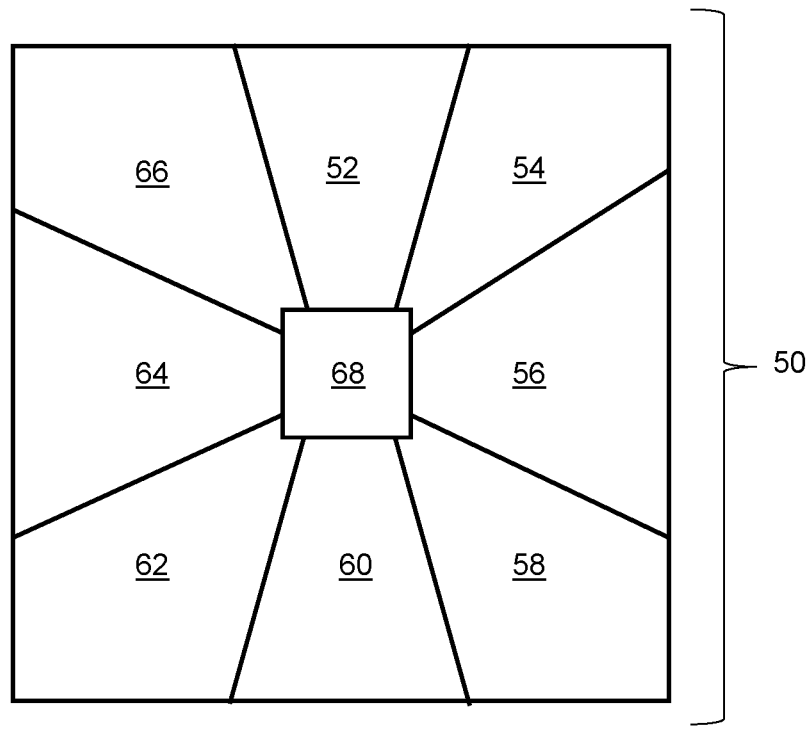
FIG. 7 shows a schematic zonal mapping scheme for a joystick input.
Figure 8:
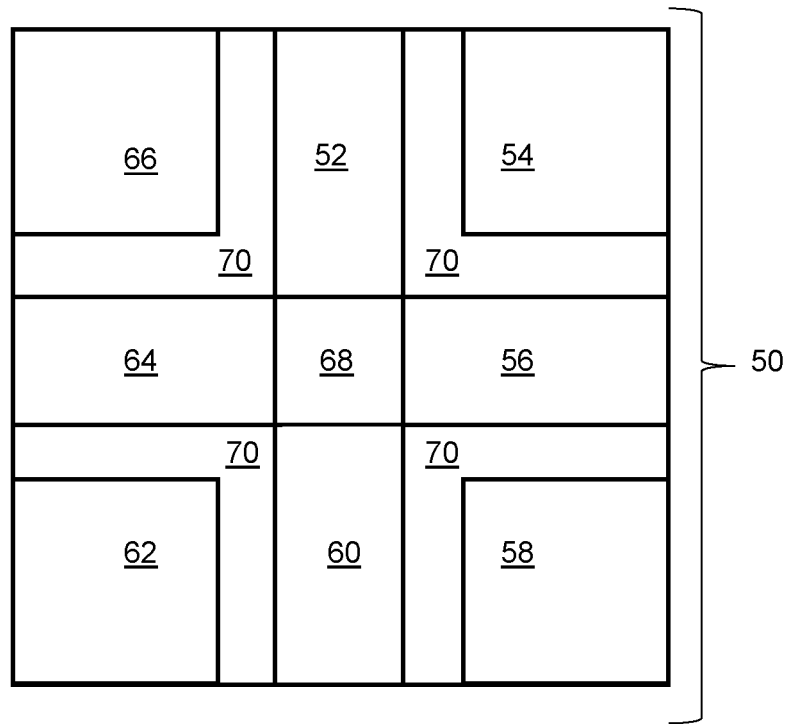
FIG. 8 shows an alternative zonal mapping scheme for a joystick input.

As shown in FIGS. 7 and 8, the joystick 12 is divided into eight zones, representing up 52, up-right 54, right, 56, down-right 58, down 60, down-left 62, left, 64 and up-left 66. The dead-zone 68 is provided at a central portion thereof. An intermediate zone 70 may be provided between adjacent zones 50 and provides either an overlap region or spatial separation thereof. The intermediate zone 70 may be used to create a different output signal at the interface between the two adjacent zones. Alternatively the intermediate zone 70 may comprise a further deadzone to prevent the user inadvertently switching between two adjacent zones if the joystick lies on a boundary thereof.

The use of an intermediate/dead zone may send a reset for all other zones.

The size and/or arrangement of intermediate/dead zones may be tailored to different users with restricted movement.

In the embodiment shown in FIG. 7, the zones 50 extending outwardly from the central dead-zone 68 in a substantially radial configuration (e.g. to define a plurality of radial sectors).

In the embodiment shown in FIG. 8, the zones 50 are arranged in a substantially rectangular array with divisions between respective zones 50 provided in the up, down, left, right cardinal directions. The intermediate zone 70 extends between: the top-left zone 66, and the top zone 52 and the left zone 64; the top-right zone 54, and the top zone 52 and the right zone 56; the down-right zone 58, and the right zone 56 and the down zone 60; and the down-left zone 62, and the down zone 60 and the left zone 64.

In some embodiments, the device may be configured to detect a separate movement category for each degree (or plurality of degrees) of rotation around a circle. Each movement which can be detected by the input device can be divided into 128 "sub-movements". Each sub-movement detected can result in a different input signal being generated.

Each of the zones 50 is operatively associated with one or more function to control the operation of the music production system. The input device therefore allows a user to select a number of discrete outputs using the joystick 12, thereby providing control of the music production system. In different modes of the input controller and/or music production software, the zonal inputs can be mapped to different input signals or types.

Figure 9:
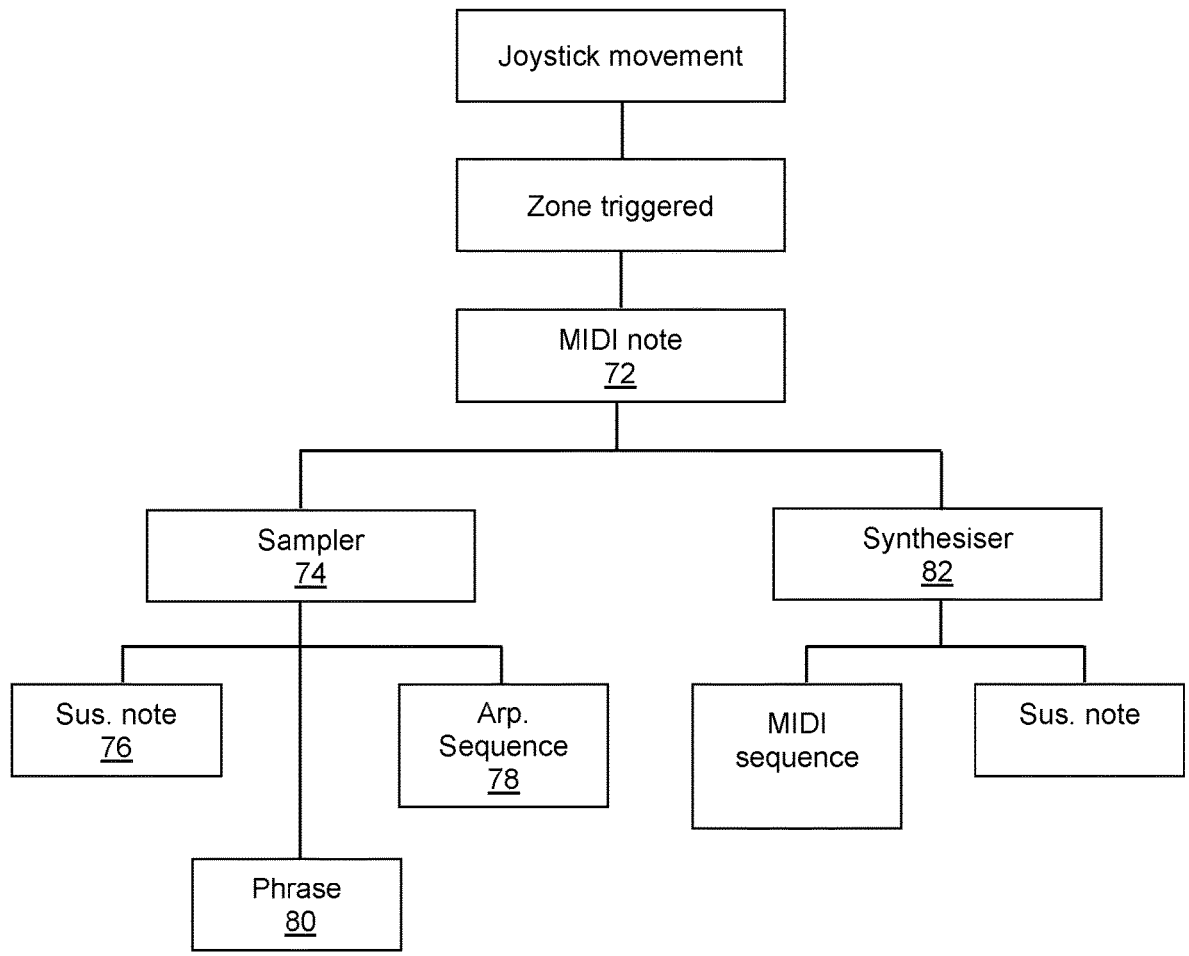
FIG. 9 shows a flow diagram for a note (MIDI) signal generated by the input device.

As shown in FIG. 9, the input device is used to create/compose a musical sequence using the music production system, i.e. a composition mode of use.

During operation, the user moves the joystick to a position within a zone 50. The input device is configured generate an output signal according to the selected zone. The signal comprises a predetermined musical note and/or chord 72 generated according to the selected zone 50 (i.e. the input device is programmed to output a musical note/chord 72). The musical note is received by the music production system. The input device may be configured such that each zone 50 is associated with a corresponding note on musical scale (e.g. a major, minor, diatonic or chromatic scale). Each zone 50 may correspond to a chord separated by a predetermined musical interval (e.g. $3^{rd}$ major/minor). For example, zones 50 may be arranged about a C-minor scale (e.g. the top zone 52 is C, the top-right zone 54 is Eb, the right zone 56 is G, the right-bottom zone is Bb and so on). In other embodiments, each of the zones 50 may correspond to an individual note in a predetermined scale. Thus, a simple movement of the joystick into a zone may trigger a zone selection signal indicating that a corresponding note/chord is to be played in the music production system.

The note 72 is provided in a Musical Instrument Digital Interface (MIDI) format. However, it can be appreciated any suitable format or digital music representation may be used.

The note 72 may be received by a sampler 74. The sound generated will depend on which musical preset has been chosen, which channel is selected, and/or where the potentiometer is set to. This allows a wide range of performance options that can be selected on the device.

The sampler 74 transforms the received note into a transformed note. The transformed note may comprise one or more of: a chord; a suspended note/chord 76; a plurality of notes/chords (e.g. a sequence); a sampled instrument phrase 80; an altered pitch note; or an arpeggiated sequence 78.

The note 72 may be received by a synthesizer 82. The synthesizer 82 generates a musical sequence according to the received note. The synthesiser may comprise a plurality of pre-stored samples and/or musical sequences. The musical may comprise one or more of: a MIDI sequence; or a suspended note/chord. The synthesiser may have a plurality of pre-defined settings to produce a musical sequence with one or more pre-defined timbres (e.g. different musical instruments, or effects etc.)

The user may use the input device to select a plurality of notes in sequence to create a musical composition. The musical composition may be recorded onto one or more channels (e.g. a bass track, a drum track, a melody track etc.), thereby allowing concurrent playback of a number of individual compositions.

The tracking of the manner in which the joystick is moved may also be used by the input device to denote additional information accompanying the zone selection. For example, the speed, acceleration and/or direction of movement of the joystick or the duration for which the joystick is held within the zone may be logged and transmitted to provide further information about the selected note, i.e. a quality or duration for the note, to the music production software.

In this regard, the information converted into an input signal for the music production system may comprise not only the zone selection/activation signal component, but also an accompanying/concurrent control signal element.

Each channel can play a single note (with any articulation), a MIDI sequence, a sampled instrument phrase or an arpeggiated pattern. Each can be decided at the top level of the song selection process and varies between pieces of music.

Figure 10:
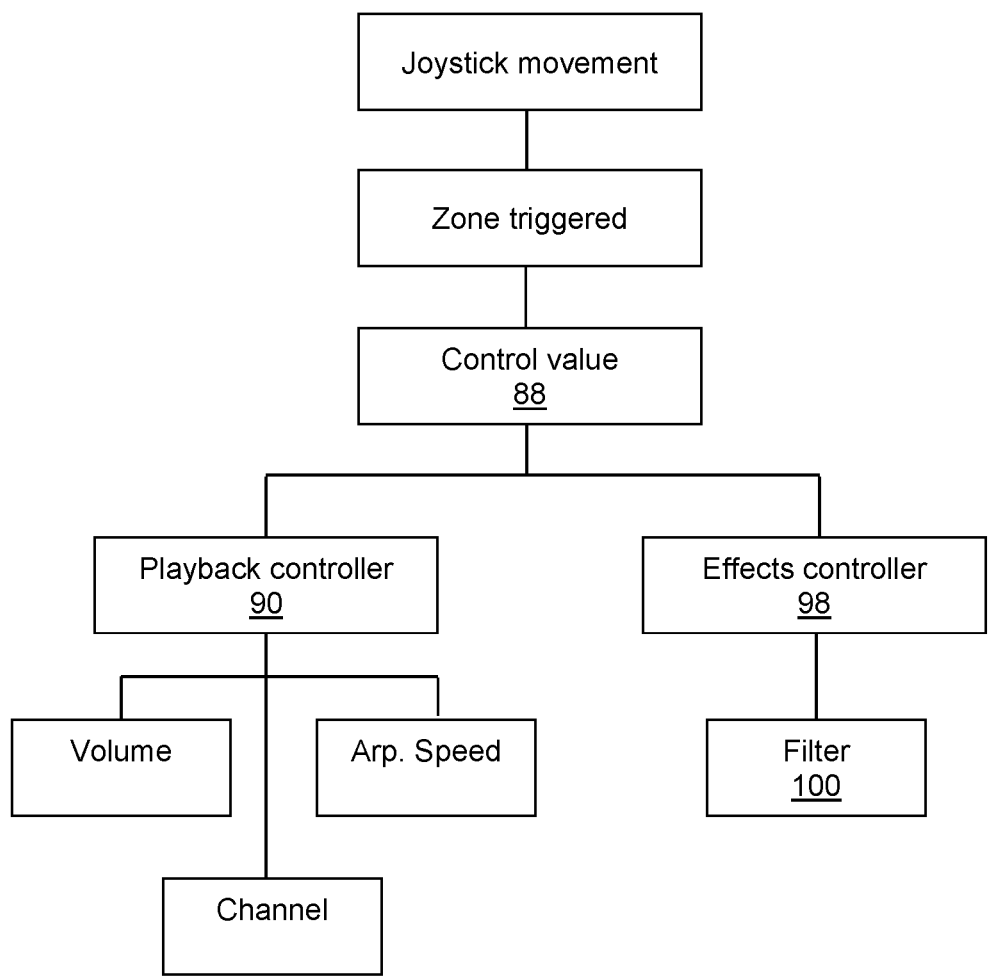
FIG. 10 shows a flow diagram for a control change signal generated by the input device.

Turning to FIG. 10, the control change information adds an additional layer of dynamic to a solo instrument or a change effects across a whole mix. This may be decided and pre-programmed, e.g. into the song templates. Some examples could include the volume, reverb and amount of voices of a solo violin (additional voices could include Viola and Cello). In an example, it could adapt the speed of a filter LFO on a bass line. In an example it could adapt an arpeggiated pattern between percussion instruments.

As shown in FIG. 10, the input device is configured to provide control of the music production system.

During operation, the user moves the joystick to a position within a zone 50. The input device is configured an output signal according to the selected zone 50 and a predetermined control value 88 is generated.

The control value 88 may be received by a playback controller 90 configured to control the playback of the musical sequence/composition. For example, the zones 50 on the input device are configured to signal the playback controller 90 to: pause; play; increase the playback speed (e.g. fast forward or rewind); incrementally move through (e.g. skipping); increase/decrease an arpeggiated speed; or increase/decrease the volume of the sequence/composition and/or change the playback channel.

The control value 88 may be received by an effects controller 98 configured to apply sound effects to the sequence/composition. The effects controller 98 applies one or more 'audio filter' 100 configured to alter the sequence/composition and change the aural properties thereof (e.g. the timbre). For example, the filter may comprise: a modulation effect (e.g. chorus, tremolo, flanger and phaser); a time-base effect (e.g. reverb, delay and echo); spectral effects (e.g. equalisation and panning); dynamic effects (e.g. compression and distortion); low, high or mid-band filtering; the number of voices of a particular instrument; and/or any other conventional sound effects.

The zones 50 of the input device are therefore mapped to select to select an appropriate sound effect. The sound effect may be applied to single sequence, an individual channel, or across the entire composition.

Navigation of the composition/control hierarchy (i.e. choosing the sampler, the synthesiser, the playback controller and effects controller) is performed using one or more of the switches 48. The switches 48 may comprise a "left" and "right" switches to allow lateral navigation of the composition/playback hierarchy, for example, to allow selection to of the appropriate filter or the type of sample generated. Additionally or alternatively, the switches may comprise an "up" and "down" switches to allow vertical navigation of the composition/control hierarchy.

Alternatively, navigation of the composition/control hierarchy is provided by the joystick. For example, the joystick may be switched to a "navigation mode", whereby the "up", "down", "left", "right" zones 50 permit navigation through the hierarchy. The joystick may then be switched back to a "composition/control" where the zones 50 are configured to generate a composition/control command.

The switches 48 and/or joystick 12 on the input device may be configured to navigate between and/or select one or more of the channels for composition and/or control thereof.

In some embodiments, the lights associated with the switch comprises certain colours associated with a respective composition/control output. For example, a first filter/note is associated with a first colour, a second filter/note is associated with a second colour etc. This allows intuitive selection of one or more options using a colour-coded scheme.

It can be appreciated that the joystick 12 and the switches 48 will act in concert to allow control of the music production system, and either of the joystick 12 and the switches 48 may be used to select between the various options during composition and/or control thereof.

A plurality of input devices may be operatively connected to the music production system to allow collaborative composition of music by a plurality of respective users. Each input device may be allocated an individual channel, thereby allowing each user to generate an individual track, which can then be combined with other trackers to provide the overall composition. The users may be assigned different musical instruments, thus allowing the plurality of users to act as a virtual orchestra.

Further buttons allow for an additional level of control and the ability to play, stop, record etc. depending on the programming of the software.

This controller aims to allow musicians, e.g. having reduced mobility, to create complex musical changes with only small movements. Using a joystick-type controller and dedicated programming of the resulting signals, it has been possible to create a musical controller that allows users with restricted movement to perform more easily and with greater sophistication than has been hitherto possible.

It will be apparent to a person skilled in the art that modifications and variations may be made to the described embodiments, without departing from the scope of the invention as defined by the appended claims.

The invention claimed is:

1. A music production system, comprising:
one or more computer processor running music production software; and
an input device arranged to provide signal inputs to the music production software, the input device comprising a joystick, one or more sensors for monitoring the position and/or orientation of the joystick, and a controller, wherein a sensor output is received by the controller and the controller generates a corresponding signal output to control one or more music production functions of the music production software, the range of movement of the joystick being divided into four or more discrete zones,
the controller generating a signal output when the joystick is moved into a corresponding zone to cause a zone selection,
wherein each of the plurality of zones corresponds to a note or chord of a musical scale and the signal output generated by the controller is a note or chord signal, the music production software being configured to generate a musical note or chord according to the signal output,
wherein the joystick movement is used by the input device to denote additional information for the signal output accompanying the zone selection, the additional information determining a quality of the musical note or chord.

2. The music production system according to claim 1, wherein four, six, eight or more zones are provided.

3. The music production system according to claim 1, wherein the joystick comprises a dead zone and movement of the joystick into the dead zone does not generate a corresponding signal and/or terminates one or more preceding signal.

4. The music production system according to claim 3, where the joystick is biased toward an equilibrium position and the dead zone is provided at the equilibrium position.

5. The music production system according to claim 3, wherein each of the plurality of zones extend radially outward from the dead zone.

6. The music production system according to claim 3, wherein the dead zone is disposed between adjacent zones of the plurality of zones.

7. The music production system according to claim 3, wherein movement of the joystick into the dead zone sends a reset for all other zones.

8. The music production system according to claim 1, wherein the signal output is received by a sampler, the sampler configured to transform the signal output into one or more of: a chord; a suspended note/chord; a plurality of notes/chords; a sampled instrument phrase; an altered pitch note; or an arpeggiated sequence.

9. The music production system according to claim 8, wherein control of the sampler is provided by the input device.

10. The music production system according to claim 1, wherein the signal output is received by a synthesiser, the synthesiser configured to generate a musical sequence according to the received signal output.

11. The music production system according to any claim 1, wherein the signal output of the controller comprises a control signal element and the music production software is configured to generate a music production control value according to the control signal element, the music production control value being received by a playback controller configured to control the playback of a musical composition.

12. The music production system according to claim 11, wherein the music production control value is received by an effects controller configured to apply one or more sound effects to the musical composition.

13. The music production system according to claim 1, wherein a speed, acceleration and/or direction of movement of the joystick is logged and transmitted to provide the additional information.

14. The music production system according to claim 1, wherein a duration for which the joystick is held within the zone is logged and transmitted to provide the additional information.

15. The music production system according to claim 1, wherein the note signal generated by the controller is a Musical Instrument Digital Interface (MIDI) signal.

16. An input device for music production communicably couplable to a remote computing device for enabling a user, in use, to generate input signals configured to control functions of a music production application running on then remote computing device, the input device comprising a main body, a joystick, one or more sensors for monitoring the position and/or orientation of the joystick, and a controller, wherein a sensor output is received by the controller and the controller generates a corresponding signal output for control of the music production application, the range of movement of the joystick being divided into a plurality of zones comprising four or more discrete zones, the controller generating a signal output when the joystick is moved into a corresponding zone to cause a zone selection, wherein each of the plurality of zones corresponds to a note or chord of a musical scale and the signal output generated by the controller is a note or chord signal, wherein the joystick movement is used by the input device to denote additional information for the signal output accompanying the zone selection, the additional information determining a quality of the musical note or chord signal.

17. The input device according to claim 16, wherein the main body comprises a first body portion having a first planar surface, wherein the joystick protrudes from the first body portion, the main body further comprising a second body portion having a second planar surface, the second body portion comprising at least one push button mechanism operable from the second planar surface.

18. The input device according to claim 17, wherein the at least one push button mechanism alters the corresponding signal output by the controller to control a music production function of the joystick.

19. The input device according to claim 17, the main body further comprising an attachment member having an adjustable grip member at one end thereof for releasably securing the main body to a support structure, in use.

20. The input device according to claim 19, wherein the attachment member comprises an armature having the adjustable grip member at a first end thereof and a mounting formation at a second end thereof, the mounting formation being shaped and configured to be removably fixed to a portion of the main body diametrically opposite the first planar surface.

21. The input device according to claim 17, wherein the first and the second planar surfaces are adjacent and at an obtuse angle relative to each other.

22. The input device according to claim 17, wherein the at least one push button mechanism of the second planar surface comprises a plurality of buttons.

* * * * *